March 4, 1958     M. DE VRIES     2,825,763
APPARATUS FOR TRANSMITTING MECHANICAL VIBRATIONS
Filed Feb. 16, 1953
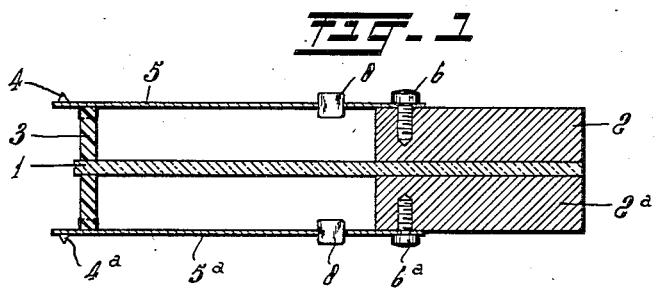
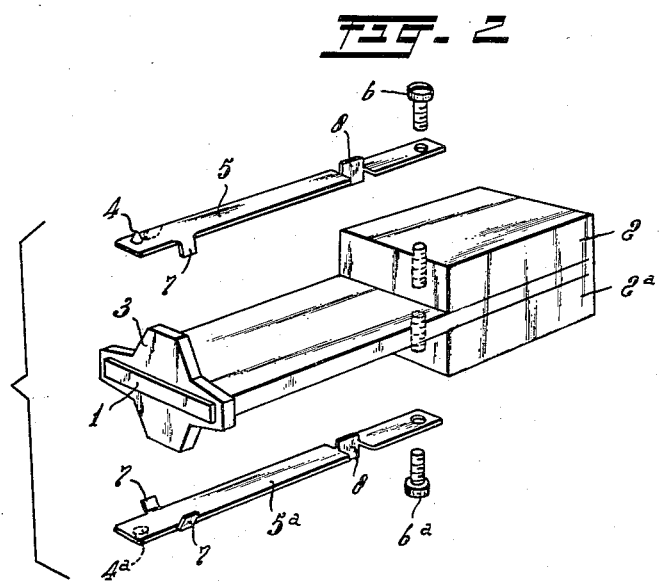
INVENTOR.
Machiel de Vries
BY
Young, Emery & Thompson
Attys.

United States Patent Office 2,825,763
Patented Mar. 4, 1958

2,825,763

APPARATUS FOR TRANSMITTING MECHANICAL VIBRATIONS

Machiel de Vries, Amsterdam, Netherlands

Application February 16, 1953, Serial No. 337,140

Claims priority, application Netherlands May 26, 1952

10 Claims. (Cl. 179—100.41)

The present invention relates to apparatus for transmitting mechanical vibrations, and may comprise, for example, part of an acoustic device.

The invention is more particularly concerned with a gramophone pick-up, such as of the piezo-electric type, and the invention will therefore be described in connection with such devices.

In gramophone disc recording, the constant velocity principle is usually applied, i. e. a constant sound intensity is recorded on the disc with an amplitude which is inversely proportional to the frequency, so that the velocity at which the position of equilibrium is passed is constant for all frequencies. If an electromagnetic pick-up is used for reproducing the record, in which pick-up the generated voltage is obtained by induction, such voltage will increase in direct proportion to the frequency, if the amplitude of the needle movement is constant.

If, however, this amplitude is not constant, but inversely proportional to the frequency, the voltage will become constant at a varying frequency. This can also be understood by bearing in mind that the induced voltage is determined by the velocity, which, in a constant velocity system, is kept constant, independently of the frequency.

If, however, the voltage is generated piezo-electrically, it is directly proportional to the amplitude. When playing a record of the type indicated above, the voltage decreases as the frequency increases, since the amplitude of the needle movement decreases as the frequency increases.

The object of this invention is to provide a coupling between the needle which follows the groove of the record and the crystal generating the piezo-electric voltage, the coupling being arranged to become closer as the frequency increases, in such a manner that, when the needle amplitude changes in inverse proportion to the frequency, in accordance with the constant velocity system, the piezoelectrically generated voltage remains constant, i. e. the output remains independent of the frequency.

Another object of the invention is to reduce the fragility of such transmitting apparatus, so that its mounting can therefore be effected better and more quickly.

A further object of the invention is to limit the mass of the moving parts of the apparatus as much as possible and to give said parts such a shape that natural vibrations within the frequency range used are avoided.

According to the invention, in apparatus for transmitting mechanical vibrations, comprising at least one vibration-supplying element and a vibration-receiving element, such elements are coupled together by a coupling body of a material, with plastic properties, such as e. g. polyvinylchloride, which at low vibration frequencies behaves like a viscous mass and hence tends to damp the vibrations, but which, at high frequencies, behaves like a harder material and provides a more firm coupling between said elements.

This change of elasticity of the coupling body with the change of the frequency can be such that a perfectly horizontal voltage-frequency curve can be obtained in the audible frequency range.

For a piezo-electric pick-up, the construction can be made very simple by causing the plastic coupling body to embrace the piezo-electric crystal with a broad end and a groove or slot provided therein, while a needle, e. g. a sapphire point, is arranged on the other, narrower end of the coupling body.

In order to enable this needle to be easily interchanged and also in order to prevent any movement of the needle in the longitudinal direction of the sound track, the needle is preferably mounted on a metallic strip, which engages the narrower end of the coupling body by means of two lugs arranged on either side of the strip, whereas the other end of said strip is secured e. g. to a holder for the crystal.

Movement in the longitudinal direction of the strip is prevented by this means. By deforming the strip over a portion of its length, so that, looking in the longitudinal direction of the strip, said portion is at right angles thereto, the strip becomes flexible in its own plane for permitting the needle to perform an oscillatory movement.

In apparatus of the turnover type having a coarser needle for ordinary records and a finer needle for microgroove records, this construction offers the particular advantage that the inoperative needle does not exert a disturbing influence and does not produce undesirable vibrations. This is due to its slight mass and the slight mass of the part of the coupling body connected therewith, so that no irregularities occur in the flat voltage-frequency curve.

The invention will now be described with reference to the accompanying drawing showing an embodiment of a pick-up provided with a piezo-electric crystal and with two needles, either of which as desired can be brought rapidly into the operative position by turning the apparatus through 180° in its holder.

Figure 1 shows a cross-section through the apparatus, whereas Figure 2 shows an exploded view of the apparatus in perspective. The reference numerals designating the various parts are the same in the two figures.

Reference numeral 1 designates a crystal, one end of which is clamped between two blocks 2 and 2a. The terminals in contact with the crystal 1 are not shown.

At the other end of the crystal, a coupling body 3 is provided, which has the shape of a block of flat material as shown in Figure 2 and has its broadest portion provided with a slot for receiving said other end of the crystal 1 therein. The coupling body 3 consists of plastic, elastically deformable material which weakly transmits low frequency vibrations, but which with increasing frequency behaves as a material that becomes firmer and firmer, so that it transmits higher frequencies more intensively. The coupling body 3 therefore causes a loose coupling at low frequencies and a more firm coupling at high frequencies between a driving needle or sapphire point 4 or 4a respectively and the crystal 1. The points or needles 4 and 4a are not directly secured to the narrower ends of the coupling body 3, but by means of an interchangeable needle holder 5 and 5a respectively. Each needle holder 5 and 5a consists of a metallic strip having one end screwed to the associated clamping block 2 or 2a by a screw 6 or 6a, while at the other end it engages a narrow end of the coupling body 3 with two bent lugs 7 for transmitting to said body 3 vibrations directed at right angles to the longitudinal direction of the needle holder 5 or 5a and located in the plane thereof. In an opening in each needle holder 5 or 5a, the associated sapphire 4 or 4a is secured.

In order to enable the particular sapphire 4 or 4a not engaging the groove of a gramophone record being reproduced to perform an oscillatory movement, a portion of each needle holder 5 or 5a is deformed as at 8 to lie substantially at right angles to the plane of the strip, so that the needle holder 5 or 5a is rendered flexible about a line substantially at right angles to the plane of the strip, so that the sapphire 4 or 4a can perform an oscillatory movement in a direction normal to its axis and at right angles to the longitudinal direction of the needle holder 5 or 5a, while undesirable movements of the sapphire 4 or 4a in the longitudinal direction of the needle holder 5 or 5a are suppressed. The needle holder 5 or 5a reinforces the transmitting apparatus, prevents undesirable movements of the sapphire 4 or 4a and is readily interchangeable.

It will be clear that it is the great deformability of the coupling body 3 which protects the apparatus against breakage and damage, during use as well as assembly, and that the construction for connecting the needle holder and the crystal is very simple, which is of particular importance in view of the small dimensions of the parts.

The coupling body 3 has the additional valuable characteristics for use in hi-fidelity reproduction of resistance to aging, as well as thermal stability. Resistance to aging means that polyvinyl chlorides and their equivalents do not lose their desired physical properties within the normal life of a cartridge of this type. Compare, for example, the brittleness acquired by rubber after a comparatively short time. That polyvinyl chloride is unaffected by aging is established in the "Handbook of Plastics," authored by Herbert R. Simonds and Carlton Ellis, published by D. Van Nostrand Company, Inc., Second Printing. Thermal stability as used herein means the property of substantially retaining the physical characteristics of the material within a range of temperatures between 32° and 120° F., the range within which the pick-up is likely to be used. See Wakeman, Chemistry of Commercial Plastics published by Reinhold in 1947. Comparison of pages 321 and 540 demonstrates that rubber elongates almost ten times as much as polyvinyl chloride in the range of 32° to 120° F.

It is remarkable that the voltage-frequency curve for records of the constant velocity type is perfectly flat when the pick-up according to the invention is used and that this curve does not show any irregularities.

This is to an appreciable extent due to the slight inert mass of the moving part of the apparatus not in use.

I claim:

1. A piezoelectric pick-up including a piezoelectric element and two gramophone stylus holders, said element and each of said stylus holders mounted by one end thereof in the pick-up, a coupling body, comprising a single block of plastic elastic material engaging the other end of each stylus holder and the other end of the piezoelectric element, the coupling body serving as the sole coupling means between the styli, and the other end of the element.

2. A piezoelectric pick-up including a piezoelectric element and two gramophone stylus holders, said element and each of said stylus holders mounted by one end thereof in the pick-up, a coupling body, comprising a single block of polyvinyl chloride engaging the other end of each stylus holder and the other end of the piezoelectric element, the coupling body serving as the sole coupling means between the styli and the other end of the element.

3. A piezoelectric pick-up including a piezoelectric element and two gramophone stylus holders, said element and each of said stylus holders mounted by one end thereof in the pick-up, a coupling body, comprising a single block of material engaging the other end of each stylus holder and the other end of the piezoelectric element, the coupling body serving as the sole coupling means between the styli, and the other end of the element.

4. A pick-up according to claim 3 in which the other end of each said holder has tabs extending therefrom, said tabs embracing said block of material.

5. A phonograph pick-up comprising, a support, a piezoelectric element mounted at one end to said support, a stylus, and means coupling said stylus to said element, said coupling comprising a block of polyvinyl chloride having the characteristics of resistance to aging, thermal stability in the range of 32°–120° F., and of damping low frequency vibrations to a limited extent and damping higher frequency vibrations to a lesser extent.

6. A phonograph pick-up element comprising, a support, a piezoelectric element mounted at one end to said support, a stylus, and means coupling said stylus to said element, said coupling element having the characteristics of resistance to aging, thermal stability in the range of 32°–120° F., and of damping low frequency vibrations to a limited extent and high frequency vibrations to a lesser extent.

7. A phonograph pick-up comprising, a support, a piezoelectric element mounted at one end in said support, a coupling member fixed to the other end of said element, and having an end portion projecting from said element, and a resilient stylus holder connected at one end to said support and carrying a stylus at the other end, said other end of said stylus holder detachably bearing against said coupler.

8. A pick-up according to claim 7 in which said holder is detachably mounted to said support.

9. A phonograph pick-up as set forth in claim 7 wherein the stylus holder engaging said end portion is provided with tabs extending from said holder and detachably embracing the sides of said projecting end portion.

10. A phonographic pick-up comprising, a support, an elongated flat piezoelectric element fixed at one end in said support, a plastic coupling member having a centrally located slot corresponding to the cross sectional configuration of said element and having at least one tapered end portion extending away from said slot, the free end of said element being inserted in said slot, at least one stylus mount, said stylus mount being fixed at one end to said support and having a stylus at the other end thereof, the other end of said stylus mount embracing said coupling member at the tapered end thereof.

References Cited in the file of this patent

UNITED STATES PATENTS

| | | |
|---|---|---|
| 1,977,433 | Dunning | Oct. 15, 1934 |
| 2,328,952 | Burt | Sept. 7, 1943 |
| 2,480,907 | Dally | Sept. 6, 1949 |
| 2,492,446 | Schumann | Dec. 27, 1949 |
| 2,567,105 | Dreisbach | Sept. 4, 1951 |
| 2,639,156 | Ward | May 19, 1953 |
| 2,689,738 | Jensen | Sept. 21, 1954 |
| 2,703,343 | Shepvangers | Mar. 1, 1955 |
| 2,816,056 | Harris | Dec. 10, 1957 |

U. S. DEPARTMENT OF COMMERCE
PATENT OFFICE

CERTIFICATE OF CORRECTION

Patent No. 2,825,763 March 4, 1958

Machiel de Vries

It is hereby certified that error appears in the printed specification of the above numbered patent requiring correction and that the said Letters Patent should read as corrected below.

Column 2, line 71, after "4a" strike out "not".

Signed and sealed this 29th day of April 1958.

(SEAL)
Attest:

KARL H. AXLINE
Attesting Officer

ROBERT C. WATSON
Commissioner of Patents